United States Patent [19]

West, Jr.

[11] 4,428,125
[45] Jan. 31, 1984

[54] INCLINATION INDICATING APPARATUS

[76] Inventor: Ivan R. West, Jr., 102 Rothmoor Dr., Gilbert, Iowa 50105

[21] Appl. No.: 336,913

[22] Filed: Jan. 4, 1982

[51] Int. Cl.³ .............................................. G01C 9/06
[52] U.S. Cl. ...................................... 33/366; 33/370; 33/333
[58] Field of Search ................. 33/366, 370, 333, 334; 116/DIG. 13; 340/686, 685

[56] References Cited

U.S. PATENT DOCUMENTS

| | | | |
|---|---|---|---|
| 2,338,811 | 1/1944 | Hasbrook | 33/366 |
| 3,218,624 | 11/1965 | Zane | 33/366 |
| 3,612,190 | 10/1971 | Wills | 173/20 |
| 3,859,651 | 1/1975 | Thomas | 340/685 X |
| 3,865,265 | 2/1975 | Brudi | 33/366 X |

Primary Examiner—Harry N. Haroian
Attorney, Agent, or Firm—James D. Birkenholz

[57] ABSTRACT

A conventional mining bore hole drill assembly having a drill mounted on a boom wherein the orientation of the drill and boom with respect to the mined material is readily adjustable. First and second inclination detectors are mounted on the boom with each detector including gravity actuated switching devices. Inclination apparatus further including read out devices positioned at the equipment operator's station to continuously allow the operator to determine whether the bore hole is being drilled at the proper angle of inclination.

3 Claims, 6 Drawing Figures

INCLINATION INDICATING APPARATUS

BACKGROUND OF THE INVENTION

The present invention relates to apparatus for use in the mining industry and more particularly to equipment for accurately determining whether the angle of inclination of a explosive bore hole is being drilled within predeteremined parimeters. In the mining industry, conventional mining techniques include the placement of an explosive charge within the solid material in order to break loose a portion of the mined material. Typically, the explosive is placed in a series of bore holes which are precisely drilled. Since water is typically used to wash out the holes during the drilling process, the holes must be drilled at an incline to insure drainage of the water. However, if the angle at which the holes are drilled is not uniform and readily determinable, the overall effectiveness of the blast will be significantly affected. Further, if the angle of inclination is too steep, the bore hole would penetrate the roof of the mine shaft, potentially causing a very serious safety condition. Thus there is a need for a device which is accurate, essentially maintenance free, easy and simple to operate, adapted to operate in a high vibration and debris filled environment, to constantly and continuously monitor the angle of inclination at which the hole is being drilled and communicate this information to the drill operator.

SUMMARY OF THE INVENTION

Inclination indicating apparatus for use with a conventional mining explosive bore hole drill assembly of the type having a drill mounted on a boom. The inclination indicating apparatus includes first and second inclination detectors mounted on the boom and connected to a power source and read out devices. The first and second inclination detectors each include gravity activated sensors and switching devices. The first sensor activates the first detector when the orientation of the boom is in its normal position and the second sensor is activated when the boom is rotated 180° about its longitudinal axis. Upon energization of the respective detector, the first switching device, being preset to energize when the boom is inclined at a given angle of inclination, switches and turns on a first read out indicating to the operator that the boom is at its minimum angle of inclination. The second switching device likewise being preset to energize when the boom reaches a predetermined angle of inclination, switches generally at a higher angle of inclination and turns on a second read out, indicating to the operator that the angle of inclination of the boom is too great.

DESCRIPTION OF PREFERRED EMBODIMENT

Figure 1:
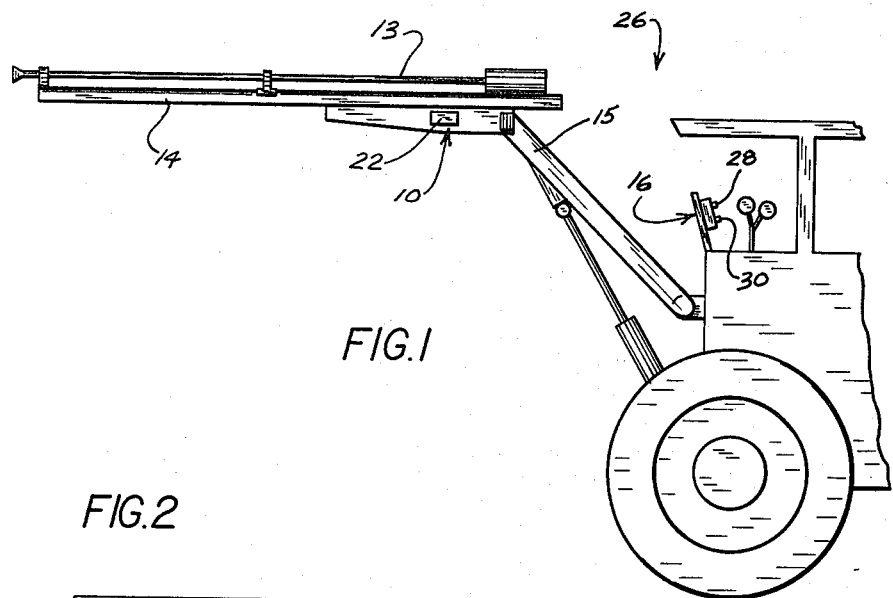
FIG. 1 is a side view of a typical boom and explosive bore hole drill with the inclination detectors mounted thereon.
Figure 2:
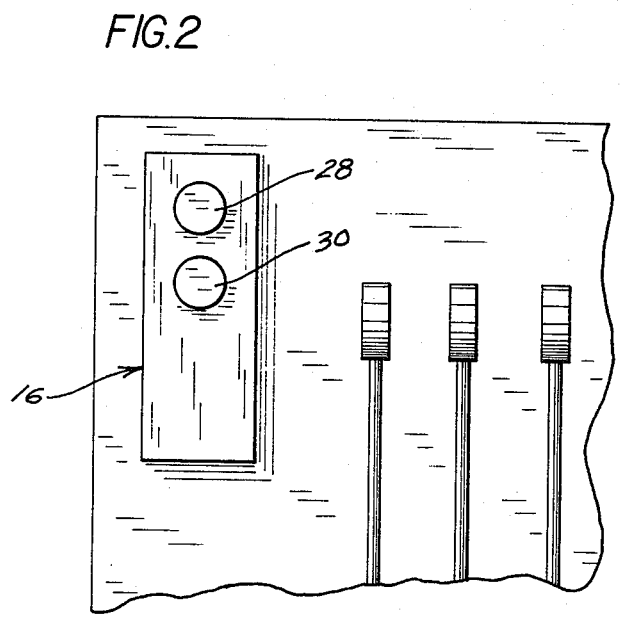
FIG. 2 is a front view of the read out devises mounted near the operator's location on the drill equipment.

Referring now to the figures wherein like reference numerials represent identical or correspondance parts throughout the several views, the inclination indicating apparatus of this invention is indicated generally at 10 in FIG. 1.

The inclination indicating apparatus 10 (FIGS. 2–5) includes generally an inclination detector means 12 mounted on a conventional mining bore hole drill assembly 14 with read out means 16. A typical mining bore hole drill 14 includes drill equipment 13 mounted on the boom 15 with the boom 15 being adjustable perpendicular to its longitudinal axis and the drill equipment 13 being movable along the longitudinal axis of the boom 15 during the drilling process, all of which are controlled by the operator. Typically, the angle of inclination of the boom 15 corresponds to the angle of inclination at which the hole is bored by the drill 13.

Figure 6:
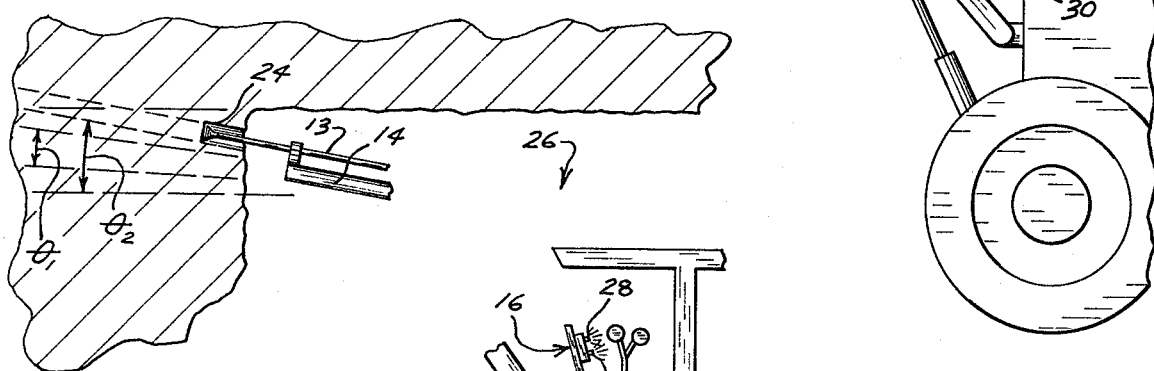
FIG. 6 is a partial perspective view of the boom and read-out devices with the boom inclined vertically with respect to its horizontal longitudinal axis at an angle beyond the predetermined parimeters.
Figure 6:
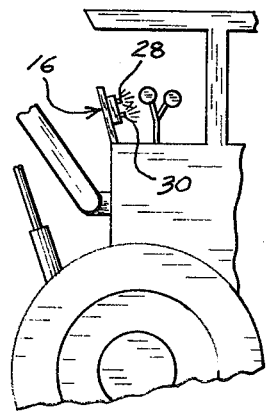

Specifically, the inclination detector means 12 (FIGS. 3–6) includes gravity actuated switching devices 18 and 20 mounted in a box 22. The switching axis of typical gravity actuated switches is the axis through which the switch is rotated during its switching process. The switching devices 18 and 20 may be conventional mercury type switches which upon rotation about their switching axis, they will switch either to complete the electrical circuit or to interupt it. The box 22 is rigidly secured to the boom 14 and provide a base on to which the switching devices 18 or 20 may be secured as well as a protective cover for the equipment from debris. The first switching device 18 is mounted in the box 22 such that its switching axis is inclined to the desired minimum angle of inclination of the finished bore hole 24 illustrated as $\theta_1$ in FIG. 5. Thus when the boom 15 is inclined, typically at an angle of two degrees above its horizontal longitudinal axis, the switching device 18 will be activated and closing the electrical circuit passing therethrough. The switching device 18 is electrically connected to a suitable source of electrical energy, typically that of bore hole drilling machine 26. The switching device 18 is also electrically coupled to the read out means 16. The read out means 16 may be any visual indicating device such as an incandescant light bulb 28 or gauge which produces a visual out-put in response to receiving electrical signal from the switching device 18. The second switching device 20 is identical to the first switching device 18 and is electrically connected to the same power source and corresponding second read out means 30. The angle of inclination of the mounting of the switching device 20 is greater than switching device 18, typically four (4) degrees, this being the maximum angle of inclination of the bore hole 24. If the angle of inclination of the boom 14 would be over that permissable ($\theta_2$ in FIG. 6), the switching device 20 will be activated with the read out means 30 being activated.

Figure 3:
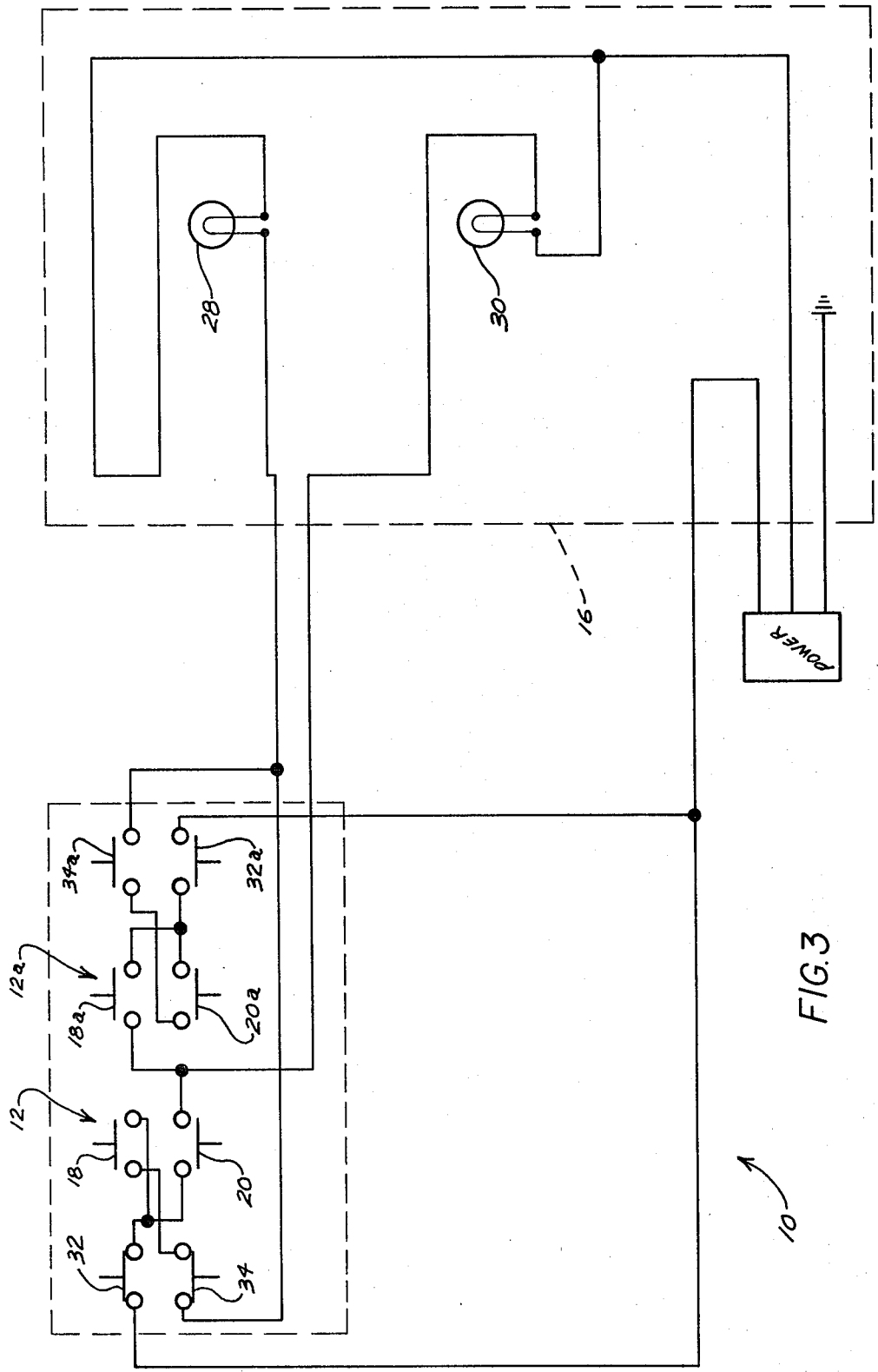
FIG. 3 is a schematic diagram of the inclination inducing apparatus.
Figure 4:
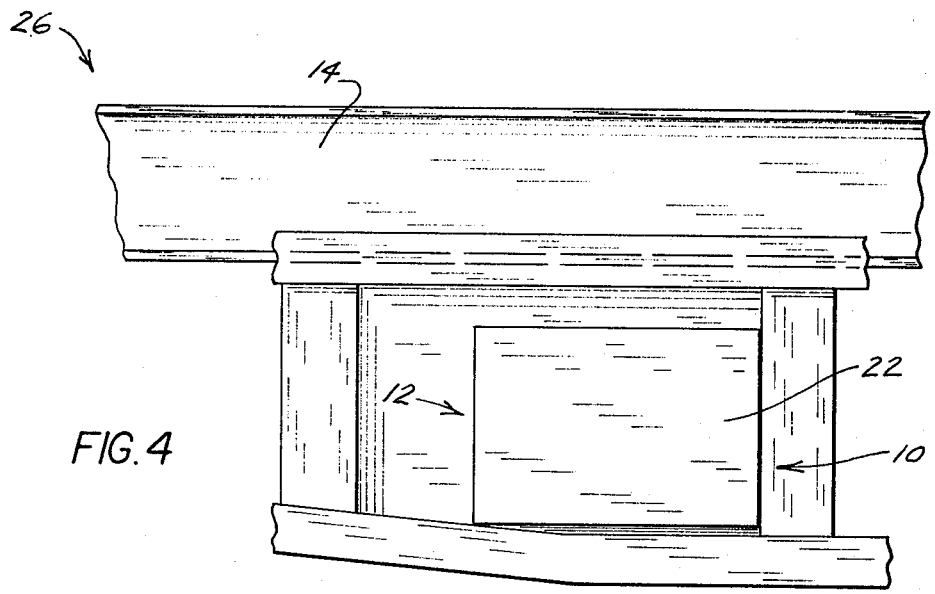
FIG. 4 is a cut away partial side view of the inclination detector mounted on the boom.
Figure 5:
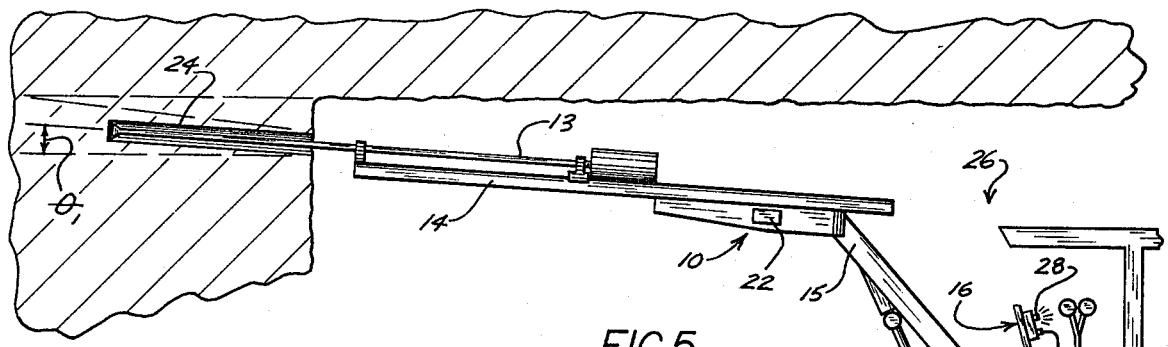
FIG. 5 is a partial perspective view of the boom and read out devises with the boom inclined vertically with respect to its horizontal longitudinal axis at an angle with the predetermined allowable parimeter.

In conventional mining bore hole drilling equipment, the boom 15 may be rotated 180° about its longitudinal axis. This neccessitates the addition of a second inclination detector means 12a utilizing similar components of the switching devices 18a and 20a. To prevent false reading, orientation sensor 32 and 34 for inclination detector 12 and 32a and 34a for inclination detector 12a are connected in series with the power supply to each of the inclination detector means 12 and 12a respectively as illustrated in FIG. 3. The orientation sensors 32, 34, 32a and 34a may be conventional gravity activated mercury switches of the type employed at 18, 18a and 20 and 20a. The sensors 32 and 34 are mounted in the box 22 and are switched closed to allow current to pass through, permitting the first inclination detector means 12 to operate upon the boom being in its normal orientation and when the boom 15 is rotated 180° to switch open, thus disabling the first detector means 12. The sensors 32a and 34a are similarly mounted in the box 22 and performs to same task with respect to the second inclination detector means 12a. As may readily be observed, the invention may be limitedly practiced with only one inclination detector means 12, without the sensor devices 32, 34, 32a and 34a when the boom 15 is not rotated, with directed electrical connection from the switching devise 18 and 20 to the read out means 28 and 30 respectively. Multiple sensors 34 and 34a are utilized to isolate the respective poriton of the circuit and prevent electrical feedback through other portions of the circuit and possibly obtaining false readings.

During operation of the bore hole drill assembly 14 (FIGS. 4–6) in its normal mode with the boom 15 in its normal mode, the sensor devices 32 and 34 would energize the first inclination detector means 12 with the sensor devices 32a and 34a de-energizing the second inclination detector means 12a. The boom 15 would be elevated to angle $\theta$ until the switching device 18 closed thus permitting an electrical signal to pass to the first read out means 28, signaling the operator that the boom 15 is at the minimum incline for drilling the bore hole 24. In the event the boom 15 continued to raise the second switching device 20 would switch closed at angle $\theta_2$ permitting an electrical signal to pass to the second read out means 30, signalling the operator that the boom 15 has raised beyond the given parimeters for the angle of inclination of the bore hole and that the boom 15 must be lowered. Upon the boom 15 being rotated 180° as previously discussed, the second inclination detector means 12a would be activated by sensor 32a and 34a and the first inclination detector 12 would be deactivated by sensor 32 and 34 with the same functioning of the inclination detector 12a as previously described for detector 12.

The inclination detectors 12 and 12a of this invention form a compact, dependable and easily operatable means for maintaining the drill assembly 14 within the prescribed parimeters of operation.

Further it is to be understood that the specific range of angles at which the inclination detectors 12 and 12a would switch is variable and dependent upon many factors including the equipment being used, material being mined and type of explosive employed, with the invention being easily adaptable to other parimeter angles.

Obviously, many modifications and variations of the present invention are possible in light of the above teachings. It is therefore to be understood that, within the scope of the appended claims, the invention may be practiced otherwise than as specifically described.

I claim:

1. Inclination indicating apparatus for use with a drill assembly mounted on a boom structure for drilling holes in a conventional mining operation, comprising:

inclination detector means for determining whether the angle of inclination of the hole being drilled is within predetermined parimeters, including a first and second gravity activated switching device, each of said switching devices electrically connected to a source of electrical energy and having a controlled switching axis about which the switching devices move resulting in a switching action and providing a controlled output in response thereto, the first switching device being alligned at a predetermined angle relative the longitudinal drilling axis of the boom and the second switching device being alligned relative the first switching device and switching at a second predetermined angle;

read out means coupled to the inclination detector means for producing a read out indication to a drill operator in response to the output received from the inclination detector means.

2. Apparatus as defined in claim 1 wherein the read out means produces a signal visually observable by the operator of the equipment.

3. Apparatus as defined in claim 1 wherein there is included a first and second inclination detector means for activating the first inclination detector means and deactivating the second inclination detector means when the boom is in a normal orientation mood and deactivating the first inclination detector means and activating the second inclination detector means when the boom is turned over −180° relative to its normal mode.

* * * * *